United States Patent [19]

Schwarzler

[11] 3,911,828

[45] Oct. 14, 1975

[54] LINEAR-INDUCTION MOTOR, E.G. FOR HIGH-SPEED MAGNETIC-LEVITATION VEHICLE

[75] Inventor: Peter Schwarzler, Furstenfeldbruck, Germany

[73] Assignee: Krauss-Maffei Aktiengesellschaft, Munich, Germany

[22] Filed: Dec. 17, 1973

[21] Appl. No.: 425,615

[30] Foreign Application Priority Data
Dec. 30, 1972 Germany.............................. 2264293

[52] U.S. Cl. ............ 104/148 LM; 310/13; 318/135
[51] Int. Cl.² .................. B61B 13/08; H02K 41/02
[58] Field of Search ................ 310/12, 13; 318/135; 104/148 MS, 148 SS, 148 LM

[56] References Cited
UNITED STATES PATENTS

| | | | |
|---|---|---|---|
| 3,333,124 | 7/1967 | Francis ................................. | 310/13 |
| 3,644,762 | 2/1972 | Eastham ....................... | 104/148 LM |
| 3,780,668 | 12/1973 | Schwarzler................... | 104/148 MS |
| 3,802,349 | 4/1974 | Guimbal ...................... | 104/148 LM |

*Primary Examiner*—M. Henson Wood, Jr.
*Assistant Examiner*—Reinhard J. Eisenzopf
*Attorney, Agent, or Firm*—Karl F. Ross; Herbert Dubno

[57] ABSTRACT

A linear-induction motor for a high-speed magnetic-suspension or magnetic-levitation vehicle comprises a U-section ferromagnetic rail having all three internal surfaces of the U formed with reaction layers of conductive material. The stator comprises a plurality of axially spaced annular windings connected in accordance with rotating-field polyphase principles and a core comprising two adjoining stacks of magnetic-metal sheets oriented in different directions for improved rigidity.

17 Claims, 5 Drawing Figures

LINEAR-INDUCTION MOTOR, E.G. FOR HIGH-SPEED MAGNETIC-LEVITATION VEHICLE

1. CROSS-REFERENCE TO COPENDING APPLICATION

The present application is related to my copending application Ser. No. 324,135 (U.S. Pat. No. 3,842,747), filed Jan. 16, 1973 and entitled "ELECTROMAGNETIC SUSPENSION AND GUIDE SYSTEM FOR VEHICLES ADAPTED TO SWITCH TRACKS" and to my copending application Ser. No. 324,151 (U.S. Pat. No. 3,842,749), also filed Jan. 16, 1973 and entitled "TRANSPORT SYSTEM WITH MAGNETIC SUSPENSION VEHICLE".

These applications, in turn, refer to commonly assigned copending applications Ser. Nos. 268,132 (U.S. Pat. No. 3,804,022) and 268,133 (U.S. Pat. No. 3,797,403), both filed June 30, 1972, to commonly assigned copending applications Ser. Nos. 280,073 (U.S. Pat. No. 3,780,668) and 280,074 (U.S. Pat. No. 3,842,748), both filed Aug. 11, 1972, and commonly assigned copending application Ser. No. 292,638 (U.S. Pat. No. 3,804,499), filed Sept. 27, 1972.

2. FIELD OF THE INVENTION

The present invention relates to linear-induction motors for high-speed drive systems and, more particularly, to a linear-induction motor for magnetic-suspension or magnetic-levitation vehicles. The invention also relates to magnetic-suspension vehicles with improved drive and suspension means.

3. BACKGROUND OF THE INVENTION

With increasing interest in high-speed vehicles for interurban, intraurban and rural-urban transport for passengers and freight, considerable attention has been directed to avoiding the use of conventional drive motors to propel the vehicles because of the frictional problems created by the transmissions and drive wheels which must be employed. Thus it has been proposed to provide linear-induction motors for such vehicles whereby the propelling force can be formed without moving parts other than a stator on the vehicle and a reaction rail along its track.

It has been proposed heretofore to provide linear-induction motors with a stator of ferromagnetic or at least magnetically permeable material on the vehicle and a reaction rail of magnetic material juxtaposed with an active side of the stator and formed along its surface confronting the stator with a layer of electrically conductive material.

Such systems operate in accordance with eddy-current principles whereby the magnetic field bridging the stator and the rail induces an eddy current in the conductive layer which, in turn, reacts with the magnetic field and, by causing the field to move along the stator, e.g., by the use of a plurality of coils energized in a rotary-field multiphase system, a linear force is produced between the stator and the rail. This force may be used to propel the vehicle.

With increasing concern about friction-force limitation of vehicle speed, there have been significant attempts to reduce or eliminate any frictional drag upon the vehicle.

In conventional rail transport, for example, the vehicle rides upon a road bed or track and the speed of the vehicle is limited to large extent, by the frictional engagement of the vehicle with the roadbed or track. Recent attempts to reduce the frictional force retarding high-speed travel have concentrated upon suspending the vehicle electromagnetically from a track or supporting the vehicle upon an air cushion. In both cases the frictional drag of the track upon the vehicle may be reduced sufficiently to require still more effective propulsion means. Within the purview of the present invention, which deals with linear-induction motors, it is contemplated that the linear-induction motors will preferably be employed with a magnetic-levitation or magnetic-suspension vehicle. It may also be employed with somewhat less advantage in an air-suspension vehicle or, where frictional limitations do not make it uneconomical, for ordinary railroad or like vehicles negotiating a track.

In a magnetic-suspension vehicle, the vehicle body is generally provided with an electromagnet arrangement whose cores are juxtaposed with armature rails along the track to maintain a suspension gap which is spanned by a magnetic field. The aforementioned applications, of course, deal with systems of that type.

Reverting to linear-induction motors and the state of the art relevant thereto, reference may be made to a recent construction in which the reaction rail is of generally U-construction with the resulting channel being open to one side to receive the stator and a plurality of annular windings spaced therealong, the coils lying in planes perpendicular to the direction of displacement and to the U-section rail.

The coils are mounted in grooves of a core structure of ferromagnetic material so that along the upper and lower flanks of the stator, active surfaces are formed which interact with layers provided along the inner flanks of the shanks of the U. These layers are conductive as indicated previously.

The use of such a linear-induction motor in high-speed magnetic suspension vehicles is not practical because the mechanical characteristics of the motor prevent it from being used at speeds in excess of 500 km/hour. Moreover, such motors cannot be readily constructed to have capacities in the megawatt range.

4. OBJECTS OF THE INVENTION

It is the principal object of the invention to provide an improved linear-induction motor which is capable of attaining high speeds and may be operated at high power.

Another object of this invention is to provide an improved linear-induction motor having a light-weight, low-cost but mechanically strong construction so that it may be used at higher powers to propel high-speed vehicles, especially those of the magnetic-suspension type.

Still another object of the invention is to provide a magnetic-suspension vehicle having a linear-induction motor free from the defects or drawbacks of linear-induction motors known heretofore.

Still another object of the invention is to provide an improved magnetic-suspension system for a levitation-type vehicle which is propelled by a linear-induction motor.

5. SUMMARY OF THE INVENTION

These objects are achieved in accordance with the present invention, with a linear-induction motor, especially for magnetic-levitation vehicles, which comprises at least one U-section channel or rail coated, or clad along three of its internal surfaces with a reactive layer of electrically conductive material and receiving the stator of the motor which may be carried by, and preferably cantilevered from, the vehicle, the stator comprising a plurality of axially spaced annular coils (ring windings) and being energized through a multiphase source in accordance with rotary-field principles.

According to this invention, the active magnetic mass of the stator includes a core surrounded by the coils and extending into the channel or rail while being subdivided along a longitudinal plane into two core-sheet stacks with the lamellae of the two stacks being oriented in different mutually orthogonal directions. The two stacks or packets are joined together along the aforementioned longitudinal plane to a rigid core structure.

The principal advantage of this construction resides in the ability to laminate the core portion confronting the web of the channel at which the flux emerges from the core and thereby reduces magnetic losses while at the same time gaining the significant stiffness which results by mechanically joining two bodies laminated in different directions.

Advantageously, the core-sheet stacks are formed without grooves while U-shaped toothed sheet stacks are provided which constitute stator teeth extending around three sides of the stator core. In this fashion the stator need not be provided with complicated grooved profiles and prefabricated finished coils may be used whereupon the toothed sheet stacks can be slid onto the stator cores.

According to a further feature of the invention, the laminating direction (direction of stacking) of each core stack is parallel to the plane of the conductive layers of the rail portion juxtaposed therewith. Thus, the U-section rail has three active conductor layers lying along the inner flanks of the shanks of the U and along the inner surface of the bight thereof respectively. The core has a first laminated stack proximal to its attachment site on the vehicle with lamella which lie in planes perpendicular to the flanks of the shanks of the U and the active conductor layers thereon whereas the laminated-sheet stack remote from the attachment site and proximal to the bight of the U has its lamella lying in planes perpendicular to the conductor layer along this bight. Consequently, the direction of lamination of each of the core sheet stacks also lies parallel to the associated active conductor portions of the respective annular coils. The coils may be constituted as generally rectangular elements having parallel longitudinal sides which confront the conductive layers along the flanks of the U and are thus parallel to the lamination of the sheets of the inner stack. At one of the ends of each generally rectangular coil, i.e., the end received within the U-section channel, the active conductor section of the coil extends parallel to the conductor layer lying along the bight and hence parallel to the direction of lamination of the outer sheet stack.

The dual-lamination assembly of core sheet stacks can be held together with tie bolts or other tractive anchors and hence may substantially fill the interiors of the coils so that a stator of high magnetic efficiency is provided. As a consequence, the height and width of the linear induction motor can be relatively small for high speeds and the length of the assembly can likewise be short by comparison with the speed.

To facilitate attachment of the U-shaped tooth-forming sheet stacks to the core in assembling the stator, it has been found to be advantageous to provide the three active surfaces of the core (both core sheet stacks) with flat recesses accommodating the tooth-forming sheet stacks. The free ends of the tooth-forming sheet stacks may project beyond the core (away from the interior of the channel or rail), and may be formed with a mounting structure to which the clamping bolts or like members are affixed. In this construction, the core stacks can be pressed against the bight of the U formed by the tooth-forming sheet stacks or, conversely, the bight of the U can be drawn against the outermost core sheet stack to lock the assembly forming the stator into a rigid body. The mounting member which bridges the free ends of the tooth-forming sheet stacks may be formed with lugs or the like for attachment of the stator to the vehicle body. The extension of the tooth-forming sheet stacks beyond the core and the use of magnetic mounting members increases the active iron cross section of the motor.

According to another feature of the invention, to avoid loss-increasing irregularities of the magnetic field, the edges of the active outer surfaces of the U-section tooth-forming sheet stacks are rounded off. Advantageously, the coils which are slid onto the core are held in place by wedges or locking members formed from the outer sheets of the tooth-forming sheet stacks. To this end, the outer sheets may be bent outwardly to overhang the coil. Wedges may be driven into the slots thereby formed below the outwardly bent sheets and between the latter and the coil.

The compact arrangement whereby the core stacks and the tooth-forming U-shaped stacks are drawn together creates a rigid structure so that the weight of the stator need not be increased by core-supporting frames or the like.

As noted previously, the linear-induction motor, according to the invention, is preferably employed in a magnetic-levitation or magnetic-suspension vehicle. It has been found desirable to use the ferromagnetic rail serving as the reaction element of the linear-induction motor as the suspension and/or guide-rail of the vehicle suspension and/or guide system in accordance with the principles of the aforementioned copending applications.

In this manner a part of the cross section of the ferromagnetic rail is used both as a reaction element for the linear-induction motor and as the armature for the suspension and guide system, thereby effecting a saving of material and cost.

The reaction rail has, because of its U-section or channel construction a relatively large resistance to bending and high strength so that it can be affixed to the track support at relatively few locations.

In other words, the reaction rail may be supported at relatively widely spaced locations without serious danger of mechanical damage. It is thus ideally constituted as a support for the suspension and guide armatures. Another advantage of this construction is that the system components on the vehicle, namely, the stator of the linear-induction motor and the suspension and guide magnets can be mounted upon the vehicle with a common mounting structure and, when the reaction rail opens horizontally while the suspension and guide armatures are open vertically, enable relatively free horizontal movement of the track members of the system and the vehicle members can be effected. This has considerable advantage for branching along the track, i.e., where the vehicle is intended to selectively pass from one track spur to another.

Preferably the armatures of the suspension and guide systems are formed as inverted U-section profiles with relatively small downwardly-extending pole surfaces while the suspension and guide magnets have upwardly open U-section cores. Alternate magnets along the direction of travel of the vehicle may be staggered from side to side with respect to a median plane of the suspension-armature rail so that any lateral movement induced by centrifugal force, wind etc. is counteracted by a magnetic force in the opposite direction.

6. DESCRIPTION OF THE DRAWING

The above and other objects, features and advantages of the present invention will become more readily apparent from the following description, reference being made to the accompanying drawing in which.

7. SPECIFIC DESCRIPTION

Figure 1:
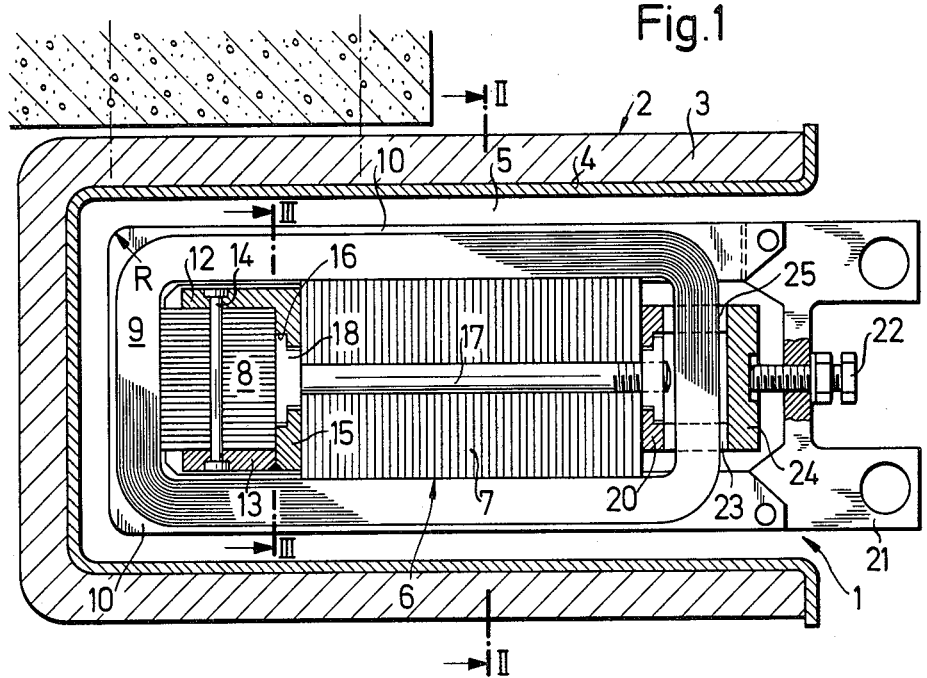
FIG. 1 is a vertical cross-sectional view through a linear-induction motor embodying the invention.

The linear-induction motor shown in FIGS. 1 - 3 and 5 comprises a stator 1 having a rectangular parallelopipedal configuration and a small longitudinal side adapted to be affixed to a vehicle 29 (FIG. 4) while the remaining three longitudinal sides or surfaces of the stator are received in a reaction rail 2. The latter comprises an iron channel 3 of U cross section which is fixed at intervals to a support or track 30 (FIG. 4) and has its three inner surfaces formed with a conductive layer 4. A gap 5 is provided between the reaction rail 2 - 4 and the stator 1.

The stator 1 comprises a stator core 6 composed of a main core sheet stack 7 and an outer core sheet stack 8, the stacks having their lamella of ferromagnetic sheets running in mutually orthogonal directions. The stator core 6 carries a plurality of generally rectangular annular coils 9 which together form a multiphase rotary field or ring winding.

Figure 2:
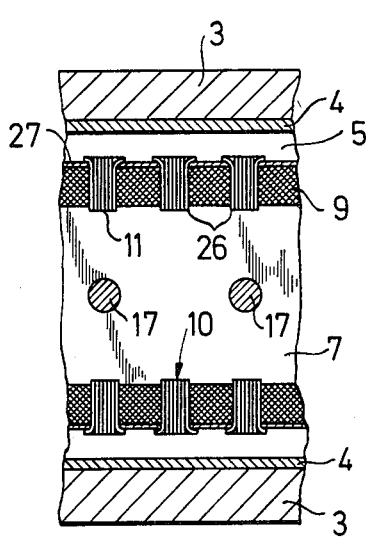
FIG. 2 is a cross-sectional view taken along the line II — II of FIG. 1.
Figure 5:
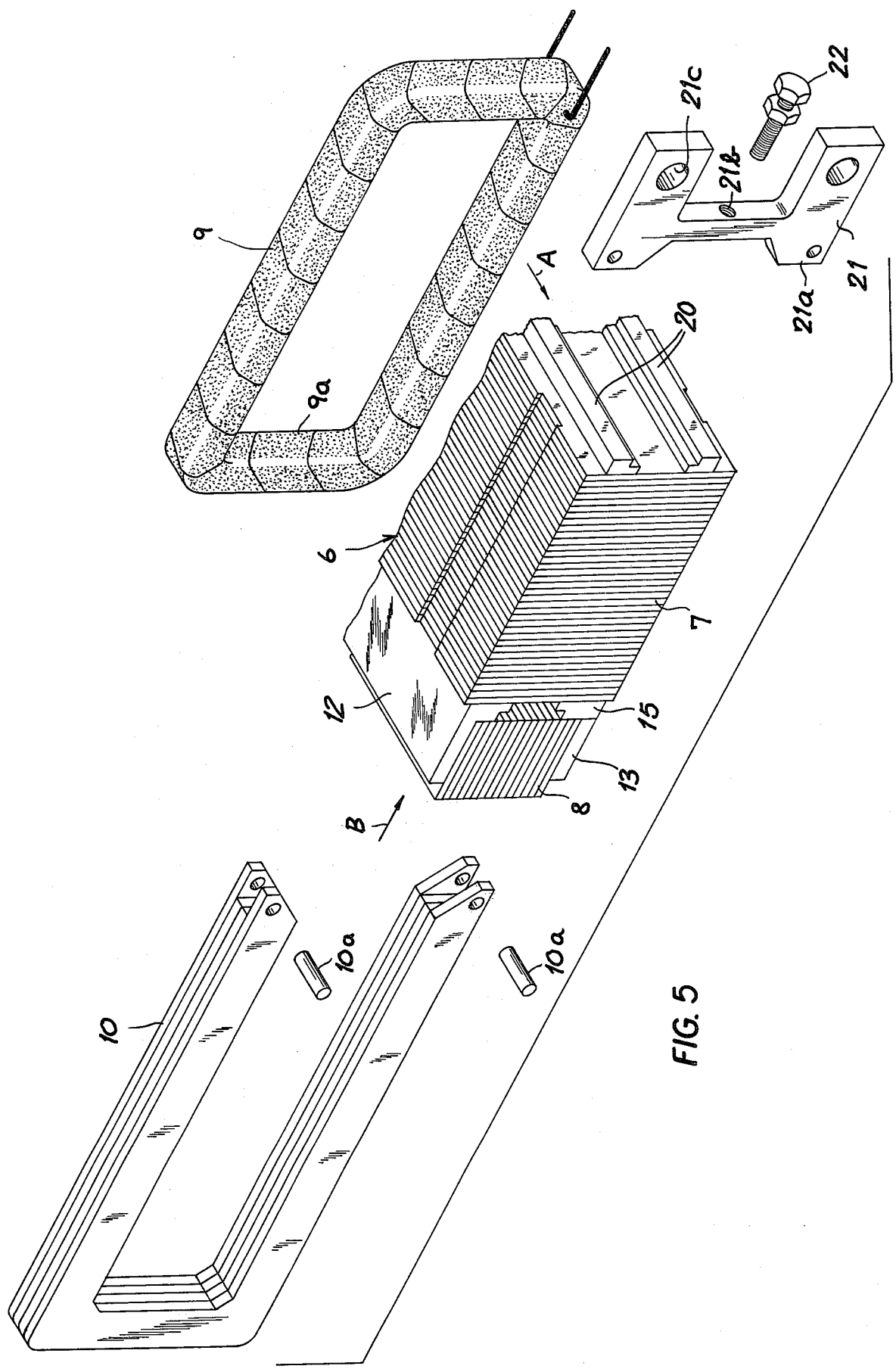
FIG. 5 is an exploded view of a portion of the linear induction motor of FIGS. 1 - 3.

Between each pair of coils 9 there is provided a U-shaped tooth-forming sheet stack 10 which is best seen in FIG. 5 and, as can be determined from FIGS. 2 and 5, has its shanks received in flat recesses 11 in the upper and lower surfaces of the core 6.

The main core sheet stack comprises lamella or sheets of ferromagnetic material extending the full length of the active portion of the stator and running perpendicular to the conductive portion 4 of the rail 2, 3 at the horizontally projecting shanks thereof. These sheets, moreover, extend parallel to the directions of travel of the vehicle and generally in vertical planes, the stack being formed by laminating the sheets in the direction in which the flanking conductor stretches of the coils 9 run. Correspondingly the stack 8 is laminated from sheets which lie in planes perpendicular to the sheets of stack 7 and perpendicular to the plane of the conductor 4 at the bight of the U formed by the rail 2, 3; the direction in which the lamella are stacked is parallel to the stretch 9a directly juxtaposed with the stack 8.

With this configuration of the stacks 7 and 8 all of the magnetic-flux outflow paths directly feed into the ferromagnetic rail 3 and all of the return paths feed from the latter into the core along edges of the lamella and hence eddy current loss within the core is minimized.

Figure 3:
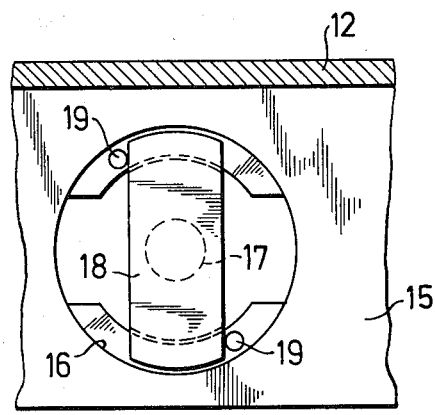
FIG. 3 is a cross-sectional view taken along the line III — III of FIG. 1.

The outer core sheet stack 8 is formed with end plates 12 and 13 which are drawn together by tie bolts 14 and a foot 15 is welded to the end plate 12 as best seen in FIGS. 1 and 3. The foot 15 is provided with a plurality of longitudinally spaced cutouts 16 in which tractive anchors 17 for the main core sheet stack 7 are fitted. The cutouts 16 are so formed (in bayonet configuration) that the head 18 of each anchor 17 can be fitted into the recess 16 in one position of the head and can be rotated through 90° and thereby held in place (see FIG. 3). The head is prevented from rotating beyond the 90° position by a pair of pins 19 or other abutments in the foot 15.

The foot 15 thus serves as a force-transmitting member between the sheet stacks and at the same time as a pressure plate for the main sheet stack 7. On the opposite side of this latter stack, the tractive anchors 17 bear against a further pressure plate 20.

As will be apparent from FIG. 5, once the core 6 is assembled by tie rods, bolts and anchors 14 and 17 and the associated pressure plates 12, 13, 15 and 20, the coils 9 are slid longitudinally over the core (i.e., in the direction of arrow A of FIG. 5) and a U-shaped tooth-forming sheet stack 10 is then inserted in the direction B perpendicular thereto. The U-shaped sheet stacks 10 are then locked against the core 6. For this purpose, the free ends of the shanks of each stack 10 are secured, e.g., by pins 10a, to lugs 21a of a bracket 21 having a lockable central screw 22 which can be threaded into the bore 21b. The screw 21 bears against the base 22 of a U-profile member 23 having the configuration of a comb whose teeth interdigitate with the coils 9 and bear against the pressure plate 20. The comb member 23 thus has slots 25 through which the coils 9 pass. The brackets 21 are also formed with lugs 21c by which the stator is mounted upon the vehicle.

The outermost sheets 26 of each stack 10 are somewhat thicker than the other sheets of the stack and have their free edges bent outwardly to form grooves which enable wedges 27 to be inserted and prevent dislodgment of the coils.

As will be apparent from FIG. 1, at the transitions between the base of each U-shaped stack 10 and its shanks, square edges are avoided and rounds R are provided to avoid inhomogeneities in the magnetic field at these corner regions. The losses which would otherwise result are avoided.

The coating 4 of conductive material upon the ferromagnetic rail 3 extends over the entire internal surface of this channel and even extends over the free ends of the shanks of the iron rail 3. This reduces horizontal forces between the stator and the reaction rail 2 which might otherwise result from edge effects. The motor operates as described in U.S. Pat. No. 3,333,124.

Figure 4:
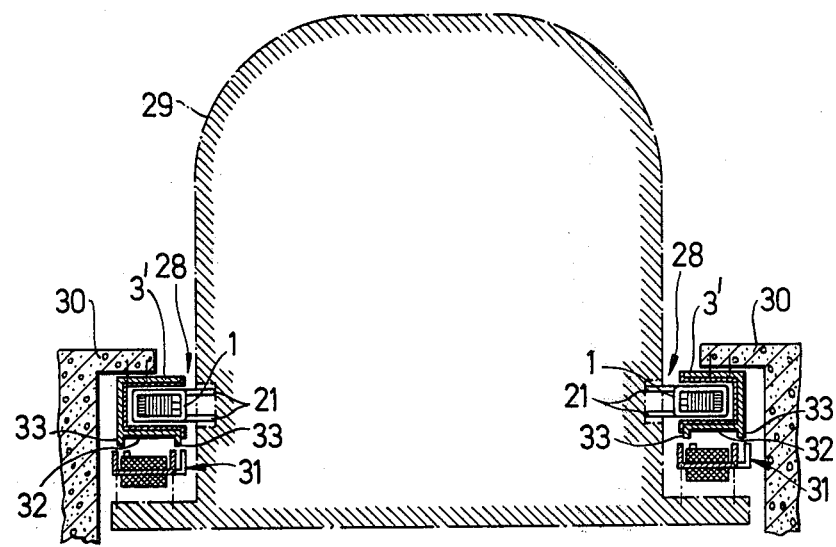
FIG. 4 is a diagrammatic vertical section through a magnetic suspension vehicle embodying the invention.

FIG. 4 shows the linear-induction motor, according to the present invention, as applied to a magnetically suspended and guided vehicle 29. On both longitudinal sides of the vehicle 29, which may operate under the principles set forth in any of the aforementioned copending applications, there are provided respective linear-induction motors 28 (as described with reference to FIGS. 1 – 3 and 5) each having its stator 1 mounted by lugs 21 on the vehicle. As previously indicated, the reaction rails 2 are fixed to the track elements 30. The reaction rails comprise U-profile channels 3' which serve simultaneously as suspension and guide armatures for the rows of suspension and guide electromagnets 31 disposed along the opposite longitudinal sides of the vehicle.

Downwardly extending pole webs 33 are formed unitarily on the lower shank 32 of the rail 3' and constitute pole pieces which cooperate with the pole pieces of the suspension and guide electromagnets 31. The electromagnets along each side of the vehicle are spaced apart and are alternately offset to opposite sides of the armature webs so that the suspension and guide forces may operate as described in the aforementioned copending applications. As also described therein, sensors can be mounted on the vehicle to monitor the suspension or lateral-guide gaps to adjust the magnetic forces so as to maintain the gap 5 and the suspension and guide gaps constant.

By separate control of the electromagnets to the right or to the left of the armature, horizontal forces upon the vehicle may be counteracted while increases or decreases in load can be counteracted by collective increase or decrease in the current traversing all of the electromagnets.

The suspension and guide fields generated by magnets 31 in the lower shank 32 of iron rail 3' run transverse to the rails while the traveling field generated by the coils 9 run parallel to the rails. Hence interference is minimized. Furthermore, the webs 33 increase the stiffness of the reaction rail 2 – 4 and allow the supports therefor to be spaced apart at considerable distances. As a consequence, the use of a common rail for suspension and guide purposes and as the reactive rail for the induction motor has not only magnetic but also mechanical advantages.

I claim:

1. A linear-induction motor comprising a reaction member having a generally U-shaped profile and composed of ferromagnetic material while being provided along each of its inner surfaces with an electrically conductive layer; a stator extending into said member and comprising a longitudinally divided core having at least two sheet stacks of different stacking directions; and annular coils encircling said core.

2. The motor defined in claim 1 wherein said stator further comprises a plurality of U-shaped tooth-forming sheet stacks straddling said core between said coils.

3. The motor defined in claim 2 wherein the core sheet stacks have stacking directions parallel to the stretches of said coils proximal thereto.

4. The motor defined in claim 3 wherein said core is formed with shallow recesses receiving the shanks of said U-shaped tooth-forming sheet stacks.

5. The motor defined in claim 3 wherein said U-shaped tooth-forming sheet stacks have shanks whose free ends extend away from said member and project beyond said core.

6. The motor defined in claim 5, further comprising brackets anchored to said free ends of said U-shaped sheet stacks, means engaging said brackets and bearing on said core for drawing said U-shaped sheet stacks and said core sheet stacks together.

7. The motor defined in claim 2 wherein said U-shaped sheet stacks have rounded edges along their active outer surfaces.

8. The motor defined in claim 2 wherein said U-shaped sheet stacks have outer sheets bent outwardly to overlie said coils and form seats for a wedge for retaining said coils on said stator.

9. An automatic-suspension vehicle system comprising a track formed with a reaction member having a generally U-shaped profile and composed of ferromagnetic material while being provided along each of its inner surfaces with an electrically conductive layer; and a vehicle magnetically suspended from said track and displaceable therealong, said vehicle being formed with a stator extending into said member and comprising a longitudinally divided core having at least two sheet stacks of different stacking directions, and annular coils encircling said core.

10. The system defined in claim 9 wherein said member is a horizontally open U-shaped rail having a pair of downwardly extending pole webs, said vehicle being provided with a row of electromagnets cooperating with said webs for magnetically suspending and guiding said vehicle.

11. The magnetic suspension vehicle system defined in claim 10 wherein said stator further comprises a plurality of U-shaped tooth-forming sheet stacks straddling said core between said coils.

12. The magnetic suspension vehicle system defined in claim 11 wherein the core sheet stacks have stacking directions parallel to the stretches of said coils proximal thereto.

13. The magnetic suspension vehicle system defined in claim 12 wherein said core is formed with shallow recesses receiving the shanks of said U-shaped tooth-forming sheet stacks.

14. The magnetic suspension vehicle system defined in claim 12 wherein said U-shaped tooth-forming sheet stacks have shanks whose free ends extend away from said member and project beyond said core.

15. The magnetic suspension vehicle system defined in claim 14, further comprising brackets anchored to said free ends of said U-shaped sheet stacks, and means engaging said brackets and bearing on said core for drawing said U-shaped sheet stacks and said core sheet stacks together.

16. The magnetic suspension vehicle system defined in claim 11 wherein said U-shaped sheet stacks have rounded edges along their active outer surfaces.

17. The magnetic suspension vehicle system defined in claim 11 wherein said U-shaped sheet stacks have outer sheets bent outwardly to overlie said coils and form seats for a wedge retaining said coils on said stator.

* * * * *